United States Patent [19]

Kobylar et al.

[11] 3,750,111

[45] July 31, 1973

[54] MODULAR DIGITAL DETECTOR CIRCUIT ARRANGEMENT

[75] Inventors: Alex W. Kobylar, Chicago; Robert L. Lindsay, Mt. Prospect; Satyan G. Pitroda, Villa Park, all of Ill.

[73] Assignee: GTE Automatic Electric Laboratories Incorporated, Northlake, Ill.

[22] Filed: Aug. 23, 1972

[21] Appl. No.: 283,118

[52] U.S. Cl. .............. 340/172.5, 340/167, 340/173, 340/347 DD, 235/155, 307/231

[51] Int. Cl. .......................... G06f 7/02, G11c 17/00

[58] Field of Search .................. 340/172.5, 347 DD, 340/146.2, 146.1, 167 R, 167 A, 167 B, 167 P, 173 AM; 235/153 AM, 154, 155; 307/225, 226, 231, 233; 328/34, 41, 119

[56] References Cited

UNITED STATES PATENTS

| | | | |
|---|---|---|---|
| 3,381,270 | 4/1968 | Huffman et al. | 340/146.1 AB |
| 3,390,378 | 6/1968 | Dryden | 340/146.2 |
| 3,428,946 | 2/1969 | Batcher | 340/146.2 |
| 3,541,507 | 11/1970 | Duke | 340/146.1 AB |
| 3,594,730 | 7/1971 | Toy | 340/347 DD |
| 3,601,801 | 8/1971 | Sauvan | 340/146.2 |
| 3,638,184 | 1/1972 | Beuscher et al. | 340/146.1 AB |
| 3,697,961 | 10/1972 | Banks | 340/172 S |
| 3,350,685 | 10/1967 | Lindaman | 340/146.2 |

OTHER PUBLICATIONS

P. Hernandez et al., "I/N Digital Detector," In I.B.M. Tech. Disclosure Bull. 9 (10) p. 1268–1269, March, 1967

*Primary Examiner*—Paul J. Henon
*Assistant Examiner*—John P. Vandenburg
*Attorney*—K. Mullerheim, Lester N. Arnold et al.

[57] ABSTRACT

A multi-stage digital detector logic circuit arrangement is provided utilizing a plurality of cascaded read-only memory ROM arrays of the transistor-transistor logic configuration to detect *m* addresses out of *N* total input information addresses, where *m* is a quantity less than *N*. Each read-only memory array has *n* input addresses where *n* is a quantity less than N but greater than *m*, and provides digital output addresses corresponding to logic conditions of zero true addresses, less than *m* true addresses, exactly *m* true addresses, and greater than *m* true addresses. The greater than *m* true addresses are processed by OR logic gates to a final result and the other logic conditions are processed through cascaded ROM arrays until a final ROM array provides a final logic result of zero true addresses out of *N* addresses, *m* true addresses out of *N* addresses, and NOT *m* out of *N* total addresses.

7 Claims, 2 Drawing Figures

MODULAR DIGITAL DETECTOR CIRCUIT ARRANGEMENT

BACKGROUND

This invention relates generally to digital detector logic circuit arrangements, and more particularly, relates to a modular logic circuit arrangement for a digital $m$ of $N$ detector using read-only memories.

In a large digital information system such as might be employed as a part of a modern telephone switching system, it is often required in performing diagnostic and/or maintenance functions to detect 1 out of $N$ ($1/N$) states or $m$ out of N (m/N) states where $N$ is the total number of states or addresses to be monitored and $m$ is a quantity less than $N$. In one prior art approach to digital detector circuits, a plurality of logic decoding gates such as AND logic circuits, each having $N$ number of inputs, are employed and the collective outputs from the decoding gates are then processed through OR logic circuits to obtain a final output state. In order to perform an $m$ out of $N$ detection function, for example, this individual decoding approach would typically employ ($mN$) decoding gates arranged in parallel and performing their detection functions simultaneously with respect to time. The real time utilization of this decoding circuit arrangement is minimal but where $N$ addresses is large this approach becomes impractical because of the large quantities and cost of the hardware. Pragmatically, where $N$ is of the order of 15, the hardware quantities required begin to approach an expense level which exceeds that desired for telephone switching application.

In another prior art approach to digital detector circuits, a shift register and counter are utilized. The shift register is used to collectively store the individual values or states of $N$ addresses in the form of a single $N$ bit word. The counter is utilized to examine the word on a bit by bit basis and at the end of a given time, the contents of the counter are interrogated to determine if $m$ true states (ones) are contained in the $N$ bit word. As is apparent, this register-counter approach to a digital detection minimizes the quantity of hardware needed but demands the utilization of a great deal more real time than does the parallel connected individual decoding gates.

It is highly desirable to achieve a digital detector circuit arrangement which can detect $m$ out of $N$ states wherein the required quantities of hardware are not exceedingly large and the real time utilization of the circuit arrangement approaches the real time utilization of the parallel connected individual decoding gates. Such a digital detector circuit arrangement has been achieved by the Applicant in the present invention utilizing the transistor-transistor logic TTL circuits in the form of read-only memory ROM circuits combined with standard AND or OR logic circuits. For a comparative analysis of the requirements for a $1/N$ circuit arrangement, the real time utilization in microseconds together with the hardware requirements by the number of individual circuit chips (logic gates or integrated circuits) for the one prior art scheme of using individual decoding gates, the register-counter scheme, and the Applicant's ROM modular approach, are as follows: where $N$ is equal to 10 addresses: approximately 0.1 μsec, and 11 chips, approximately 0.5 μsec, and 2 chips, and approximately 0.1 μsec, and 4 chips, respectively; where $N$ is equal to 50 addresses: approximately 0.1 μsec. and 255 chips, approximately 2.5 μsec. and 10 chips, and approximately 0.1 μsec. and 10 chips, respectively; when $N$ is equal to 80 addresses: approximately 0.1 μsec. and 648 chips, approximately 4 μsec, and 16 chips, and approximately 0.15 μsec. and 16 chips, respectively; where $N$ is equal to 800 addresses: approximately 0.1 μsec. and 64,080 chips, approximately 40 μsec. and 160 chips, and approximately 0.2 μsec. and 130 chips, respectively; and where $N$ is equal to 5,000 addresses: approximately 0.1 μsec. and 2,500,500 chips, approximately 250 μsec. and 1,000 chips, and approximately 0.3 μsec. and 808 chips, respectively. Similar economics of real time and hardward utilization are realized through employing the $m/N$ circuit arrangement.

SUMMARY

It is therefore an object of the present invention to provide digital detector circuit arrangements having the versatility to detect 1 out of $N$ as well as $m$ out of $N$ addresses, which arrangements utilize parallel operation for conserving real time and minimize equipment needed through the employment of read-only memory logic circuits.

In one practice of the invention a $1/N$ digital detector circuit arrangement is constructed through making use of a $2\times2^n$ bit, TTL read-only memory ROM array as the basic circuit. The number of such ROM circuit arrays required is expressed by the following formula A:

$$\#ROM's = \underset{N>n^1}{|N \div n|} + \underset{N>n^2}{|N \div n^2|} + \underset{N>n^3}{|N \div n^3|} + |N \div n^4| + \cdots \qquad (A)$$

$N$ equals the number of input addresses to be monitored and $n$ equals the number of input leads (less than $N$) which can be conveniently implemented as inputs to a commercially available ROM circuit. The basic ROM circuits of the $1/N$ detector circuit arrangements are expanded in modular stages, i.e., the outputs of a first stage pf ROM circuits comprises the inputs for a subsequent or second stage of ROM circuits, and so forth for subsequent stages. Up to $n^1$ inputs can be handled by one stage, $n^2$ inputs with two stages, $n^3$ inputs handled by three stages, etc., $n^x$ inputs handled by $x$ number of stages. The states of the inputs to be distinguished in the $1/N$ detector circuit arrangement in each ROM logic circuit are $0/n$ (all zero or no trues), $1/n$ (one true), and $\geq 2/n$ (two or more trues). One ROM circuit Which has been selected has eight inputs and four outputs, only two outputs thereof being utilized for representing $1/n$ occurrence and $<1/n$ occurrence. The first term of formula A is the number of ROM circuits needed for the first stage of the modular multi-stage detector circuits while the second, third, fourth and further terms give the number of ROM circuits needed for correspondingly numbered stages of the detector circuit. Each of the eight lead input ROM circuits have two direct outputs indicating both one out of eight and more than one out of eight. The one out of eight (1/8) outputs generated in the various stages are provided as inputs to the ROM circuits of subsequent stages until a single output is obtained from the detector circuit arrangement. The more than one out of eight (>⅛) outputs from the various stages are inputted to OR logic circuits through various stages to form a single such output. Finally, a terminal stage of logic circuits are provided to give a single output of either 0, $1/N$, and $>1/N$. In the $1/N$ detector circuit arrangement, $N$ input leads are subdivided into parallel and cascaded groups of eight leads, each eight lead group addressing a $2^8$ (256) word position ROM circuit, and the formula A becomes:

$$\#ROM's = \underset{N>8}{|N \div 8|} + \underset{N>64}{|N \div 8^2|} + \underset{N>512}{|N \div 8^3|} + |N \div 8^4| + \ldots \qquad (B)$$

Utilizing formula $A$ where $N$ equals 10 states or 50 states, it is at once apparent that three or eight ROM logic circuits are required for the $1/N$ detector circuit arrangement, respectively. Where $N$ is equal to 5,000 addresses or states, some 717 ROM logic circuits would comprise the $1/N$ detector circuit arrangement. As stated above, each ROM circuit includes two single bit outputs, namely, a ⅛ output bit and a >⅛ output bit, and the logic truth table for the single ROM circuit is presented as follows:

TABLE I

| ADDRESS | BIT 1 (1/8) | BIT 2 (>1/8) |
|---|---|---|
| 0000 0000 (0) | 0 | 0 |
| 0000 0001 (1) | 1 | 0 |
| 0000 0010 (2) | 1 | 0 |
| 0000 0100 (4) | 1 | 0 |
| 0000 1000 (8) | 1 | 0 |
| 0001 0000 (16) | 1 | 0 |
| 0010 0000 (32) | 1 | 0 |
| 0100 0000 (64) | 1 | 0 |
| 1000 000 (128) | 1 | 0 |
| All other 247 combinations | 0 | 1 |

If the number of addresses $N$ is not a multiple of eight, then the remaining unused inputs on one of the ROM circuits are tied to binary zero which in effect disables them.

In another practice of the invention, an $m/N$ digital detector circuit arrangement is constructed through using a multi-stage ROM logic circuit, each ROM circuit input having $n$ addresses or leads and $m+1$ output addresses or leads representing an $m+1$ bit word size, where $m<n$ and $n<N$. In order to perform the $m/N$ detection digitally, the first stage of the $m/N$ detectpr circuit divides the $N$ input leads into groups of n input leads which can be accommodated by a selected ROM module size, the size being dependent upon the values of $m$ and $n$ with the total number of bits being given by $2^n$ $(m+1)$. The relevant outputs of an ROM logic circuit are as follows: (1) all $m$ output words are zero corresponding to all zero binary input; (2) ($1n$) output words with a true random weight TRW of one "1" corresponding to binary inputs of $1/N$; (3) ($2N$) output words with a TRW of two "1's" corresponding to binary inputs of a $2/N$; ($mn$) output words of $m$ "1's" corresponding to binary inputs of $m/N$; and (4)

$$i = \sum_{(m+1)}^{n}$$

($in$) output words with the ($m+1$) bit equal to "1" corresponding to binary inputs of TRW $<m/N$. In other words, all relevant outputs are generated from $0/n$, $1/n$, $2/n$ . . . $m/n$, and more than $m/n$. As previously stated, the number of ROM modules required within the first stage is dependent on the number of input addresses n which are available to the selected ROM module size. This is expressed by the formula $\propto_1 = |N \div n|$ where $\propto_1$ represents the number of ROM modules for the first stage and | | represents the next largest whole number value where $N$ is not an exact multiple of $n$. The second or next stage is concentrated by a factor of $m+n$ and becomes $\propto_2 = |N \div n| \cdot (m \div n)|$ where $\propto_2$ represents the number of ROM modules for the second stage. A typical intermediate stage $i$ has $\propto_i = |\propto_{i-1} \cdot (m \div n)|$ numbers of ROM modules. Further concentration occurs until the final stage is reached comprised of a single ROM module with $n$ input addresses. The more than $m/N$ output leads are processed through the use of OR logic circuits since any such output from whichever stage derived causes the input to fail the $m/N$ check. The output leads of each ROM module are coded to comprise independent entities and can be distributed as inputs to subsequent stages in any arbitrary manner. At the output of the final stage when a single ROM module is reached, simple digital logic circuitry is used to provide the outputs of $0/N$, $m/N$ and not $m/N$. If desired, the proper decoding logic circuitry could be utilized to provide 1/N, 2/N, . . . $m-1/N$ outputs as well.

Other objects and advantages of the invention will naturally occur to those skilled in the pertinent art as the invention is described in connection with the accompanying drawing in which:

THE DRAWING

DETAILED DESCRIPTION

Figure 1:
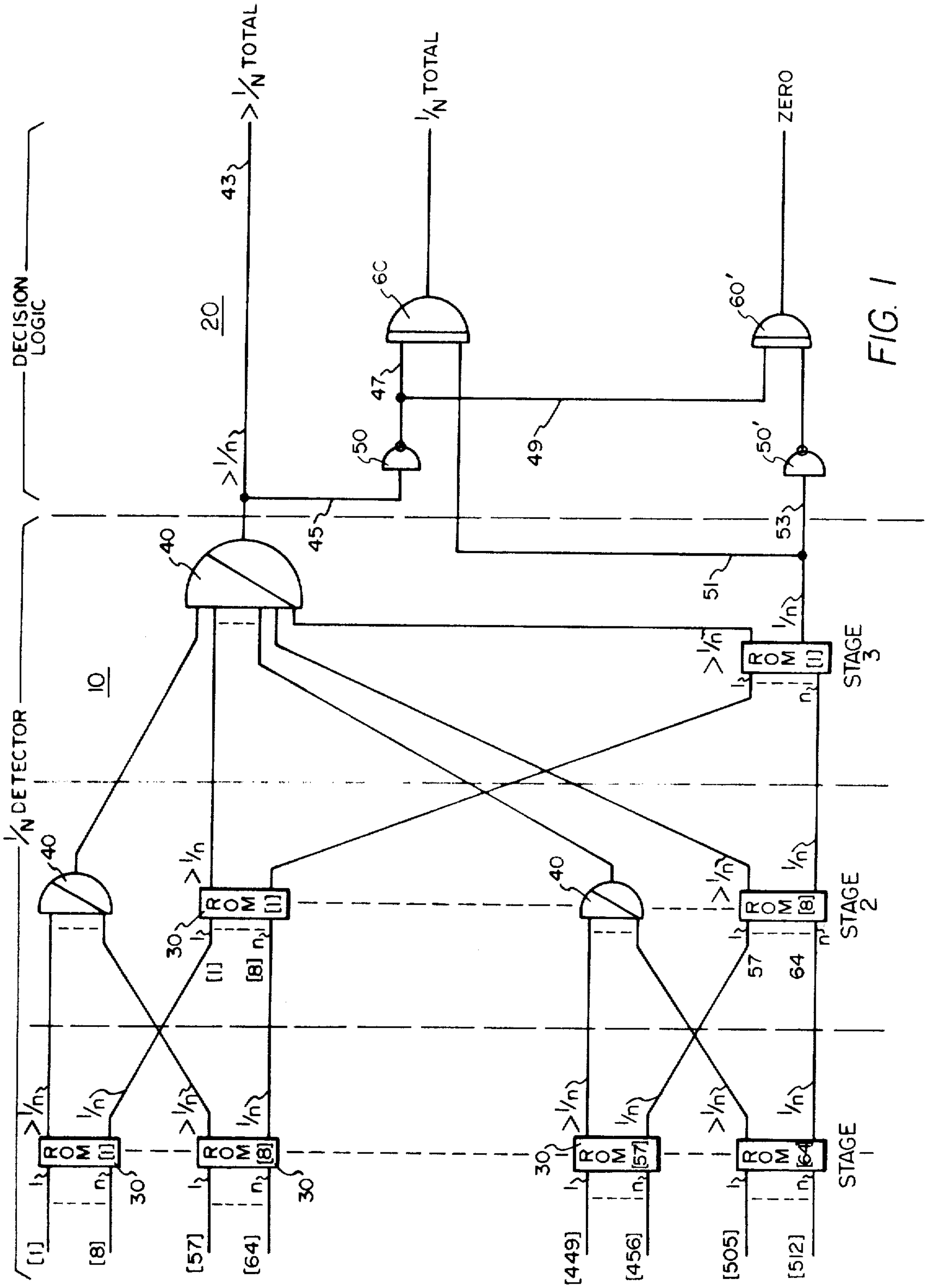
FIG. 1 is a representative functional block diagram of a one out of $N$ ($1/N$) digital detector circuit arrangement according to the principles of the present invention.

FIG. 1 shows a multi-stage digital detector circuit arrangement for a $1/N$ digital detector 10 including first, second and third stages combined with digital logic circuits 20 for comprising the final decision logic. There is shown at 30 read-only memory ROM circuits of the transistor-transistor logic configuration having input leads or addresses 1 through $n$ where $n$ represents the available number of input addresses accommodated by a selected ROM circuit. In the comparison of hardware as presented above between the arrangements of individual decoding logic gates, the register-counter scheme and the presently presented ROM logic circuits, it is to be understood that for a given size integrated circuit chip available in the market place having a somewhat standard retail price, a purchaser could obtain on such chip either TTL circuits, decoding logic circuits, register or counter circuits; therefore, it becomes economically meaningful to compare the numbers of such chips required to accomplish the various techniques irregardless of the particular type of circuits mounted thereon.

The output addresses of an individual ROM circuit 30 are used to represent true or "1" binary state for the conditions of either $1/n$ or greater than $1/n$. The first stage outputs from a number of ROM circuits 30 as calculated by the formula A are further processed by comprising inputs to the second stage of the $1/N$ digital detector circuit 10. The greater than 1/n outputs are supplied as inputs to typical logic OR gates 40 for being processed to the decision logic circuit 20 supplying a final greater than $1/N$ output result. The $1/n$ outputs from $|N \div n|$ numbers of first stage ROM circuits 30 comprise inputs to $\underset{N>n^1}{|N \div n^2|}$ numbers of second stage ROM circuits 30. The greater than 1/n outputs from the second stage ROM circuits are again provided as inputs to logic OR gates 40 and the $1/n$ outputs comprise inputs to $|N \div n^3|$ numbers of third stage ROM $N > n^2$ circuits 30. Each ROM circuit 30 of an intermediate stage can accommodate the $1/n$ outputs of $n$ number of ROM circuits 30 of the previous stage. This pattern is repeated for the next subsequent stage of ROM circuits 30 and logic OR gates 40 and so on until the final stage is reached wherein only a single ROM circuit 30 is provided. The $1/n$ output from such final ROM circuit 30 is thus representative of a $1/N$ output address. Thereafter, the $>1/N$ and $1/N$ outputs are processed by the final decision logic circuit 20.

Upon the occurrence of a true or "1" binary state output from the logic OR gate 40 of the third stage of FIG. 1, a $>1/N$ total output is given by the lead wire 43. Simultaneously, a lead wire 45 supplies the true $>1/N$ output to a logic INVERTER gate 50 which, in turn provides over lead wires 47 and 49 "not true" 22 $1/N$ outputs to logic AND gates 60 and 60', respectively. Upon the occurrence of a true of "1" binary state output from the $1/n$ output lead of the final stage ROM circuit 30, a 1/N input is simultaneously provided over lead wires 51 and 53 to the logic AND gate 60 and to a logic INVERTER gate 50', respectively. The true $1/N$ output from the final stage ROM circuit 30 is, of course, exclusive of the occurrence of an >1/N output from the final stage logic OR gate 40 so that the logic INVERTER gate 50 supplies a true of "1" binary state over lead wire 47 to the AND gate 60 when the condition of the output lead wires 43 and 45 are in a not true or "0" binary state. Hence, the logic AND gate 60 now is provided with true inputs over both lead wires 47 and 51 and thus provides a true $1/N$ total output result. Further, when the $>1/N$ output of logic OR gate 40 is "0," a "1" state is provided over lead wire 49 to the logic AND gate 60', and when the $1/N$ output is "1", the logic INVERTER gate 50' supplies over lead wire 55 a "0" input to the AND gate 60' and thus the gate 60' is disabled to present a true ZERO binary output result. It is apparent that when both $>1/N$ and $1/N$ outputs are "0," the logic AND gate 60' is enabled and a true ZERO binary output is obtained. The following TABLE II which represents the logic truth table for a single $1/n$ ROM circuit is presented as follows:

TABLE II

| ADDRESS | BIT 1 ($1/n$) | BIT 2 ($>1/n$) |
|---|---|---|
| 0000 00-- --0 | 0 | 0 |
| 1000 00-- --0 | 1 | 0 |
| 0100 00-- --0 | 1 | 0 |
| 0010 00-- --0 | 1 | 0 |
| 0001 00-- --0 | 1 | 0 |
| 0000 10-- --0 | 1 | 0 |
| 0000 01-- --0 | 1 | 0 |
| . | | |
| . | | |
| . | | |
| . | | |
| $a_0a_1a_2a_3$ ---- --$a_{n-1}$ | 1 | 0 |
| . (where $a_i$=1, | | |
| .$a_{j \neq i}$=0 with $n$ combinations) | | |
| . | | |
| . | | |
| 000 00-- --1 | 1 | 0 |
| All other 2−($n$+1) combinations | 0 | 1 |

It is now convenient to assign an arbitrary value of eight to the numerical representation n and to illustrate the configuration and operation of the $1/N$ digital detector circuit of FIG. 1 when $N$ equals 512 original addresses to be sampled. It is also convenient to utilize two circuits 10 and 20 as illustrated in FIG. 1 and for this purpose, the numerical values enclosed in brackets should be referred to. It is thus seen that the first stage of the 1/512 detector circuit 10 would include 64 individual ROM circuits 30, the second stage includes eight such ROM circuits and the third and final stage includes only a single such ROM circuit. The first ROM circuit of the second stage processes the ⅛ outputs from the first through the eight ROM circuits of the first stage of the detector circuit 10 and so on. With the occurrence of a true or "1" binary state on input lead [8] to the first ROM circuit of the first stage and no other true inputs to the first stage, a single true input is provided over input lead [1] to the first ROM circuit of the second stage, and thereafter, over input lead [1] to the final ROM circuit which, in turn, results in a $1/N$ total output result. In particular, the $1/N$ or 1/512 result from the final ROM circuit is supplied to logic INVERTER gate 50' and to the logic AND gate 60, while the logic AND gates 60 and 60' are provided with true binary inputs from the logic INVERTER gate 50, the result being that the logic AND gate 60 is enabled and the logic AND gate 60' is disabled.

Now considering the ROM circuits 30 of the first stage to be comprised of eight groups of eight ROM circuits when $N$ equals 512 possible input addresses, let us follow the operation of the detector circuit arrangement when there is a true input on two different ROM circuits originating within the same group of ROM circuits, namely, a true input on lead [8] of ROM circuit [1] and a true input on lead [57] of ROM circuit [8]. Obviously the ROM circuit [1]of the second stage will be provided with true addresses on input leads [1] and [8], resulting in a true >⅛ output address to the logic OR gate 40 of the final stage and a $>1/N$ total output result. Similarly, consider the operation of the overall detector circuit arrangement when there is a true input address received on two different ROM circuits originatIng in two different ROM groups, namely, a true input on lead [8] of ROM circuit [1] and a true input on lead [456] of ROM circuit [57] in the first stage. It is readily understood that ROM circuit [1] of the first and second stages will provide a true ⅛ output address to the final ROM circuit and that the final ROM circuit will also receive a true ⅛ output address via the ROM circuit [57] of the first stage and the ROM circuit [8] of the second stage. Accordingly, the final ROM circuit provides a true >⅛ output to the final stage logic OR gate 40 and a true $>1/N$ total output is realized.

It is now appropriate to consider the occurrence of both >⅛ and ⅛ events as inputs to the first stage of the detector circuit arrangement. There is provided a true >⅛ address over input lead [57] of the ROM circuit [8] of the first stage and two true ⅛ addresses over input leads [449] and [456] of the ROM circuit [57]. Resulting therefrom, a true ⅛ address is inputted to the ROM circuit [1] of the second stage and a true >⅛ address is provided from the ROM circuit [57] of the first stage to a second stage logic OR gate 40. Next, the ROM circuit [1] of the second stage provides a true ⅛ address to the final ROM circuit from which a true ⅛ address is provided over lead wires 51 and 53 to the logic AND gate 60 and the logic INVERTER gate 50', respectively. The logic OR gate 40 of the second stage further provides the true § ⅛ input to other subsequent logic OR gates 40 such as the final logic OR gate 40 until a true $>1/N$ total input is realized. The logic IN- VERTER gate 50 inverts the binary true >1/*N* address to a binary not true address supplied to the logic AND gate 60 to thus disable the gate 60 from providing the true 1/*N* total output.

The above events have illustrated the operation of the detector circuit arrangement when the >⅛ event has occurred because of more than one ⅛ event having been detected by a single ROM circuit 30. One final illustration will be set forth wherein >⅛ event is the result of a number of more than one ⅛ events being inputted to different ROM circuits of different groups. For example, true ⅛ addresses are provided as follows to the ROM circuits of the first stage, namely, on lead [8] to ROM circuit [1]; on leads [57] and [64] to ROM circuit [8]; on lead [449] to ROM circuit [57]; and on lead [505] and [512] to ROM circuit [64]. As a result, the following binary addresses are provided as inputs to the second stage of the detector circuit arrangement, namely, true ⅛ addresses to the ROM circuit [1] and [8] and true >⅛ addresses to the two separate logic OR gates 40 shown in FIG. 1, when then provide two true >⅛ addresses to the final stage logic OR gate 40 of FIG. 1. The ROM circuits [1] and [8] of the second stage provide true ⅛ addresses to the final stage ROM circuit which therefore provides a true >⅛ address to the final logic OR gate 40. The final result is a true >1/*N* total output address. If only one first stage ROM circuit receives two or more true ⅛ addresses and no further true ⅛ addresses are received, it is obvious that that first stage ROM circuit will provide a true >⅛ binary address to the subsequent stage logic OR gate 40 whereupon the >⅛ binary address is OR'ed until a final >1/*N* total binary output is realized.

Figure 2:
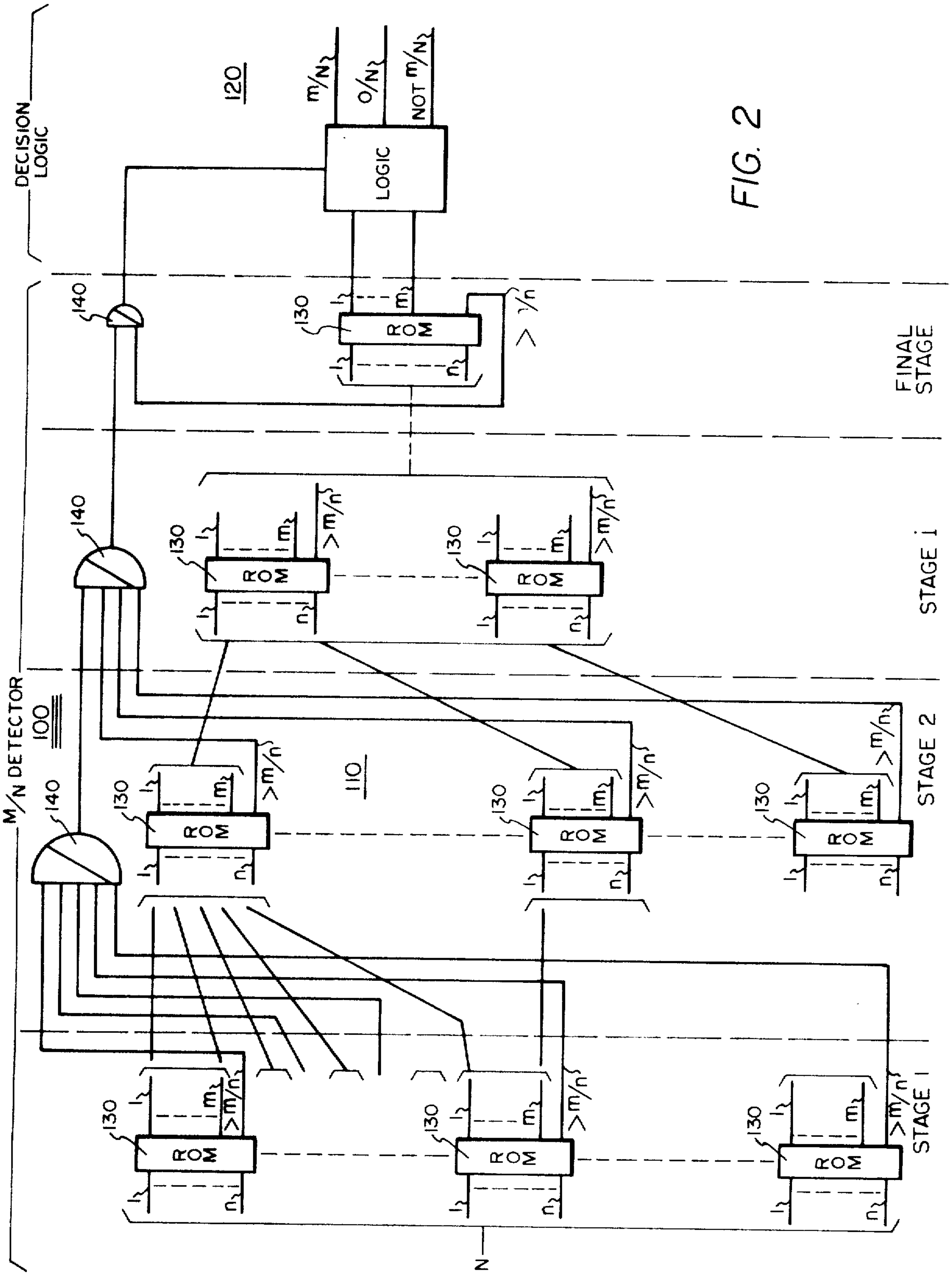
FIG. 2 is a representative functional block diagram of an $m$ out of $N$ ($m/N$) digital detector circuit arrangement according to an alternative embodiment of the present invention.

Now considering FIG. 2, there is shown a digital detector circuit arrangement 100 comprised of an *m*/*N* detector circuit 110 and a decision logic circuit 120. The *m*/*N* detector circuit 110 is a broader application of the above-disclosed 1/N detector circuit 10 wherein it is desired to detect the occurrence of *m* out of *N* binary addresses to the first stage instead of only one out of *N* addresses. Each ROM circuit 130 has n number of input addresses and *m*+1 output addresses where $m<n$ and $n>N$. In order to perform the *m*/*N* detection digitally, the first stage of the *m*/*N* detector circuit 110 divides the N total input addresses into groups of *n* input addresses or leads which number can then be accommodated by a selected ROM module size, the size being dependent upon the particular values of a m and n with the total bits of an address being given by $2^n \cdot (m+1)$. The relevant output addresses of a given ROM logic circuit 130 are as follows: (1) all *m* output words or addresses are zero corresponding to all zero binary input; (2) (1*n*) output words or addresses with a true random weight TRW of binary one "1" corresponding to binary inputs of 1/*N*; (3) (2*n*) output words or addresses with a TRW binary two "1's" corresponding to binary inputs of 2/*N*; (*mn*) output words or addresses of m "1's" corresponding to binary inputs of *m*/*n*; and (4)

$$i = \sum_{(m+1)}^{n}$$

(*in*) output words with the (*m*+1) bit equal to "1" corresponding to binary inputs of TRW >*m*/*N*. In other words, all relevant outputs from the ROM circuits 130 are generated from 0/*n*, 1/*n*, 2/*n*, . . . *m*/*n*, and >*m*/*n*.

The number of ROM circuits 130 which are required for the various stages of logic circuits are as follows: for the first stage, $\alpha_1 = |N+n|$ where $\alpha_1$ represents the number of ROM circuits for the first stage and $|\ |$ represents the next largest whole number integer where N is not an exact multiple of *n*; for the second stage, $\alpha_2 = |n \div n \cdot (m \div n)|$; for any intermediate stage *i*, $\alpha_i = |\alpha_{i-1} \cdot (m \div n)|$; and a single ROM module for the final stage prior to the decision logic circuit 120. The relevant outputs from the decision logic circuit 120 are zero total output, *m*/*N* total output and NOT *m*/*N* total output. A single ROM circuit includes 1 through *m* output addresses thereafter combined as a single input address to an ROM circuit of the immediately subsequent stage, and also a >*m*/*n* output word or address which is provided as an input to a subsequent stage logic OR gate such as indicated at 140 in FIG. 2. It is apparent from a consideration of FIG. 2 that all the >*m*/*n* output addresses are processed by the OR gates 140 without further reference to any ROM circuits 130 in order to arrive at a NOT *m*/*N* total output result. Also, the NOT *m*/*N* total output is representative of a possible occurrence of 1/*N*, 2/*N* . . . *m*−1/*N* total output results, but is conveniently represented in a combined form of NOT *m*/*N*. In the operation of the detector circuit 110 of FIG. 2, when *m*/*n* or less than *m*/*n* input addresses are received by a selected ROM circuit 130, the plurality of true output addresses are provided as a single true input address to a cascaded ROM circuit 130 of subsequent stage, and where the cascaded ROM circuit 130 receives enough true input addresses to constitute >*m*/*n* input addresses, the cascaded ROM circuit 130 instead provides a true >*m*/*n* output to a cascaded logic OR gate 140.

It is to be understood that while the present invention has been shown and described with reference to the preferred embodiments thereof, the invention is not limited to the precise forms set forth, and that various modifications and changes may be made therein without departing from the spirit and scope of the present invention.

What is claimed is:

1. A digital detector circuit arrangement for use with a digital information system for detecting the occurrence of a first quantity of logic input addresses out of a total quantity of logic input addresses comprising: a plurality of digital memory circuit means, each thereof having a second quantity of logic input addresses greater than said first quantity thereof and less than said total quantity of logic input addresses, and further having a first quantity of logic output addresses equal to one greater than said first quantity of input addresses, said output addresses including a sequential series of selectively occurring output addresses varying from one logic input address out of said second quantity of input addresses to said first quantity of input addresses out of said second quantity thereof and further including one output address representative of greater than said first quantity of input addresses out of said second quantity thereof, said plurality of memory circuit means being arranged in multiple adjacent arrays of independent connected ones of said memory circuit means within a given array and including a first array, a plurality of intermediate arrays and a final array, the number of memory circuit means in each following adjacent array decreasing by a concentration factor defined by said first quantity of input addresses divided by said second quantity thereof, the number of said memory circuit means in said first array being the next highest order integer of said total quantity of input addresses divided by said second quantity thereof, the number of said memory circuit means in any selected intermediate array of said multiple arrays being the next highest order integer of the number of said memory circuit means for said immediately preceding one of said arrays multiplied by said concentration factor, and a final of said arrays including a single one of said memory circuit means, digital decoding means in selected ones of said multiple adjacent arrays for receiving multiple ones of said one output address and providing therefrom a single one of said one output address whereby all such single ones of said one output addresses are combined to following adjacent arrays until a final single one of said one output addresses is provided, and decision logic circuit means for receiving said first quantity of logic output addresses from said memory circuit means of said final array and said final single one of said one output addresses from said digital decoding means and providing therefrom final digital logic output addresses including a logic output address representing said first quantity of input addresses out of said total quantity thereof, another logic output address representing zero input addresses out of said total quantity thereof and still another output address representing other than said zero and said first quantity of input addresses out of said total quantity thereof.

2. The digital detector circuit arrangement of claim 1 wherein said digital memory circuit means are comprised of read-only memory transistor-transistor logic circuits.

3. The digital detector circuit arrangement of claim 2 wherein said first quantity of input addresses is equal to one true logic input address out of said total logic input addresses, said plurality of read-only memory circuits is represented by a plurality of additive terms, each term being equal to the next highest order integer of said total quantity of logic input addresses divided by said second quantity thereof raised to an exponential power equal to the successive number of said term and said term being added so long as said total quantity of input addresses is greater than said second quantity thereof raised to an exponential power of one less than the successive number of said term, the number of input addresses to be processed by said arrays is equal to said second quantity raised to an exponential power corresponding to the number of said arrays, and said first quantity of output addresses is represented by one out of said second quantity of input addresses and greater than said one out of said second quantity of input addresses.

4. The digital detector circuit arrangement of claim 1 wherein said digital decoding means are comprised of logic OR gates.

5. A digital detector circuit arrangement for a digital information system for detecting the occurrence of $m$ logic addresses out of $N$ total logic a:dresses comprising: a plurality of digital memory circuit means having n logic input addresses and $m+1$ logic output addresses, respectively, where $m$ is less than $n$ and $n$ is less than $N$, said $m+1$ logic output addresses being 1 out of $n$ through $m$ out of $n$ inclusive and greater than $m$ out of $n$, said plurality of memory circuit means being arranged in multiple adjacent arrays of decreasing numbers of said memory circuit means with a concentration factor between said adjacent arrays of $m$ divided by $n$, the number of said memory circuit means in a first of said adjacent arrays being the next highest order integer of $N$ divided by $n$ and in each intermediate one of said adjacent arrays being the next highest order integer of the number of said memory circuit means in an immediately preceding one of said adjacent arrays multiplied by said concentration factor, and a final of said adjacent arrays including a single one of said memory circuit means, digital decoding means in selected ones of said arrays for receiving multiple ones of the greater than $m$ out of $n$ logic addresses and providing therefrom a single one of said greater than $m$ out of $n$ output addresses to subsequent arrays, and decision logic circuit means for receiving from said final array the greater than $m$ out of $n$ output address and the one out of $n$ through the $m$ out of $n$ output addresses and providing therefrom a final plurality of digital logic output addresses comprising $m$ out of $N$, zero inputs out of $N$, and NOT $m$ out of $N$.

6. The digital detector circuit arrangement of claim 5 wherein said digital memory circuit means have a total binary bit capacity of $2^n \cdot (m+1)$.

7. A digital detector circuit arrangement for detecting the occurrence of a single true binary input address out of a total quantity of binary input addresses, comprising: a plurality of digital memory circuit means arranged in multiple adjacent stages, each of said memory circuit means having a first quantity of input addresses thereto greater than one and at least a pair of output addresses therefrom, one of said pair of output addresses defined by a logic condition of one out of said first quantity of input addresses and another of said pair of output addresses defined by another logic condition of greater than one out of said first quantity thereof, the number of such input addresses to be processed by said stages being defined by said first quantity of input addresses raised to an exponential power corresponding to the number of said stages, said plurality of digital memory circuit means being represented by a plurality of additive terms, each term being equal to the next highest order integer of said total quantity of logic input addresses divided by said first quantity thereof raised to an exponential power equal to the successive number of said term and said term being added so long as said total quantity of input addresses is greater than said first quantity thereof raised to an exponential power of one less than the successive number of said term, means for receiving and decoding a plurality of said other output addresses to obtain a single one of said other output addresses, and decision logic circuit means for receiving a final one of said one output address from said memory circuit means and a final one of said other output address from said decoding means and providing therefrom final digital logic output addresses including a first logic condition of one out of said total quantity of logic input addresses, a second logic output address representing zero input addresses out of said total quantity thereof and a third output address representing greater than one out of said total quantity of input addresses.

* * * * *